US008879827B2

(12) United States Patent
Aviv et al.

(10) Patent No.: US 8,879,827 B2
(45) Date of Patent: Nov. 4, 2014

(54) ANALYZING STRUCTURED LIGHT PATTERNS (75) Inventors: Ziv Aviv, Bat Hefer (IL); David Stanhill, Hoshaya (IL); Ron Ferens, Ramat Hasharon (IL); Roi Ziss, Ramat-Yishay (IL)

(73) Assignee: Intel Corporation, Santa Clara, CA (US)

( * ) Notice: Subject to any disclaimer, the term of this patent is extended or adjusted under 35 U.S.C. 154(b) by 76 days.

(21) Appl. No.: 13/538,209

(22) Filed: Jun. 29, 2012

(65) Prior Publication Data

US 2014/0003722 A1    Jan. 2, 2014

(51) Int. Cl.
G06K 9/00 (2006.01)
G06K 9/48 (2006.01)
G06K 9/46 (2006.01)
G06K 9/36 (2006.01)

(52) U.S. Cl.
USPC ............ 382/154; 382/198; 382/203; 382/292

(58) Field of Classification Search
None
See application file for complete search history.

(56) References Cited

U.S. PATENT DOCUMENTS

| 2004/0031335 A1* | 2/2004 | Fromme et al. ............ 73/865 |
| 2009/0016572 A1 | 1/2009 | Hassebrook et al. |
| 2010/0304854 A1 | 12/2010 | McEldowney |
| 2012/0063672 A1 | 3/2012 | Gordon et al. |
| 2013/0125408 A1* | 5/2013 | Atwell et al. ............ 33/503 |

FOREIGN PATENT DOCUMENTS

| KR | 10-2009-0048104 A | 5/2009 |
| KR | 10-2011-0080290 A | 7/2011 |

OTHER PUBLICATIONS

International Search Report and Written Opinion received for PCT Patent Application No. PCT/US2013/047657, mailed on Oct. 7, 2013, 10 pages.

* cited by examiner

Primary Examiner — Bhavesh Mehta
Assistant Examiner — David F Dunphy
(74) Attorney, Agent, or Firm — Jordan IP Law, LLC (57) ABSTRACT Systems and methods may include utilizing a structured light pattern that may be, among other things, decoded in the three directions (e.g., vertical, horizontal, and diagonal). In one example, the method may include detecting a first feature of a target image in a return image, designating a feature type of the first feature, and an index with the letter, wherein the index is associated with the pattern slide. The method may also include calculating a horizontal position in the pattern slide of the first feature, calculating a vertical position in the pattern slide of the first feature, and calculating a depth of the first feature.

30 Claims, 8 Drawing Sheets

ANALYZING STRUCTURED LIGHT PATTERNS

BACKGROUND

1. Technical Field

Embodiments generally relate to structured light patterns. More particularly, embodiments relate to utilizing a structured light pattern that may be decoded in three directions (e.g., vertical, horizontal, and diagonal).

2. Discussion

Structured light may be used to project a known pattern of pixels onto a target image. When an image is returned, the manner in which the pattern of pixels is deformed may allow a vision system to calculate depth and surface information in the target image.

Typically, information may be encoded using sets of specifically-designed features that may be decoded in one direction (i.e., horizontal, vertical). However, in some cases, particular aspects of a image may require more particular consideration. For example, in the case of small objects of high importance (e.g., a human finger), one-dimensional decoding may be inadequate.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
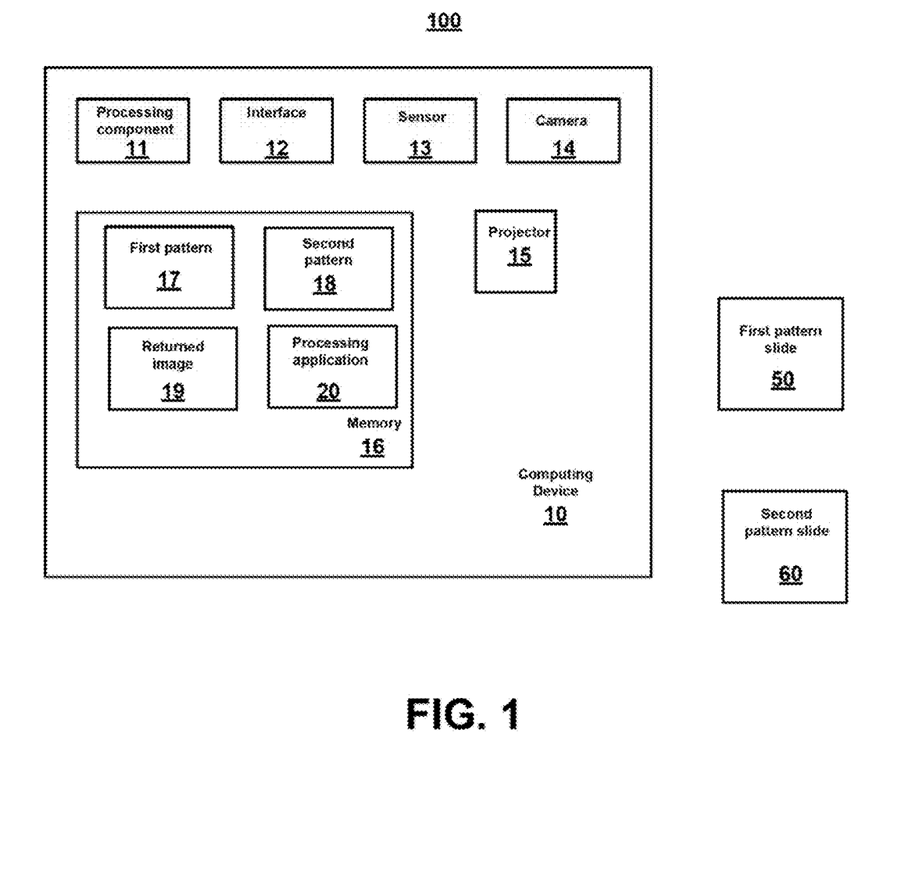
FIG. 1 is a block diagram of an example of a computer system that may analyze a structured light image in accordance with an embodiment of the invention.

Turning now to FIG. 1, a block diagram of an example of a computer system 100 that may analyze a structured light image is shown. The computer system 100 may include a computing device 10, a first pattern slide 50, and a second pattern slide 60.

The computing device 10 may be, among other things, any programmable machine that may carry out a sequence of logical operations. In this embodiment, the computing device may be a desktop computer. The computing device 10 may include a processing component 11, an interface 12, a sensor 13, a camera 14, a projector 15, and a memory component 16.

The processing component 11 may include at least one computer processor that may be utilized to execute computer-readable executable instructions. For example, as will be discussed in greater detail, the processing component 11 may be utilized to execute an application directed to analysis of a structured light image. The interface 12 may allow a user to interact with the computing device 10. In this embodiment, the interface 12 may be a desktop computer monitor displaying a graphical user interface (GUI). The sensor 13 may be a sensor to detect transmission of electromagnetic energy. In this embodiment, the sensor 13 may be a photo detector.

The camera 14 may be any device configured to capture an image or a video feed of an object or image. The projector 15 may be an optical device that projects an image onto a surface. In this embodiment, the projector 15 may include a projection screen.

The memory component 16 may be any device configured to store data. In this case, the memory component 16 may store, among other things, a first pattern 17, a second pattern 18, a returned image 19, and a processing application 20.

As will be discussed in greater detail, the first pattern 17 may be a pattern that may be used to, among other things, decode the features of a structured light image in three directions. In this embodiment, the first pattern 17 may take the form of a bitmap image. The first pattern 17 may be used to fabricate the first pattern slide 50 reflecting the features of the first pattern 17.

As will be discussed in greater detail, the second pattern 18 may be a pattern that may be used to, among other things, decode the features of a structured light image in three directions. In this embodiment, the second pattern 18 may also take the form of a bitmap image. The second pattern 18 may be used to fabricate the second pattern slide 60 reflecting the features of the first pattern 18.

The returned image 19 may be an image returned as a result of a projection (e.g., using the projector 15). In this embodiment, the returned image 19 may be an image that is returned using the first pattern 17. In another embodiment, the returned image may be an image that is returned using the second pattern 18.

The processing application 20 may be a software application that may be executed by a processor (e.g., the processing component 11). The processing application 20 may be configured, to analyze a returned structured light image (e.g., the returned image 19).

As will be discussed in greater detail, analysis of a returned structured light image may include detecting the position of a first feature reflected on a pattern slide fabricated to a pattern image (e.g., the first pattern 17), recognizing the feature type of the first feature, and determining a unique neighborhood of features including the first feature. It may further include utilizing an index to locate the first feature by determining a horizontal position and a vertical position of the first feature on the pattern slide and calculating a depth of the first feature. The horizontal position and the vertical position of the first feature may be used during processing of a target image to determine a depth of the first feature. Depth measurement using structured light may be used in a diverse array of applications. These may include, for example, movement recognition (e.g., human gesture recognition), precision shape measurement for production control (e.g., in the case of turbine blades), and precision alignment during fabrication (e.g., computer architecture component placement).

The arrangement and numbering of blocks depicted in FIG. 1 is not intended to imply an order of operations to the exclusion of other possibilities. Those of skill in the art will appreciate that the foregoing systems and methods are susceptible of various modifications and alterations.

For example, in the embodiment illustrated in FIG. 1, the processing application 20 may be configured to analyze a returned structured light image. However, in other embodiments, this need not necessarily be the case. In other embodiments, analysis of a structured light image may instead be performed by a microcontroller including a firmware component, an application-specific integrated circuit, a logic array, a field programmable gate array, a processing element, or the like.

Figure 2:
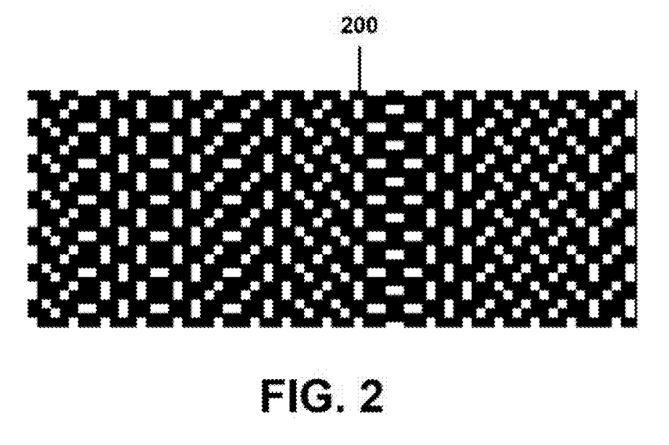
FIGS. 2-5 are illustrations of examples of patterns in accordance with embodiments of the invention.

FIG. 2 is an illustration of an example of a first pattern 200 in accordance with an embodiment of the invention. As will be discussed in greater detail, the first pattern 200 shown in FIG. 2 may be decoded in three directions. Similar to the first pattern 17 (FIG. 1), the first pattern 200 may be stored in a computer memory, such as the computer device memory 16 (FIG. 1).

Figure 3:
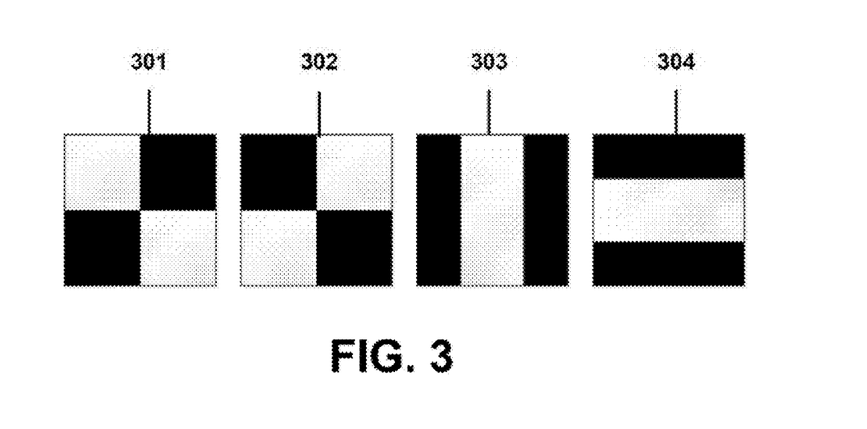

FIG. 3 is an illustration of an example of a pattern in accordance with an embodiment of the invention. More specifically, FIG. 3 illustrates four basic features 301, 302, 302, and 304 of the first pattern 200 (FIG. 2). The first basic feature 301 may be a checkerboard design, with the second basic feature 302 being its inverse. The third basic feature 303 may include vertical rectangles placed adjacently to each other, while the fourth basic feature 304 may be made up of horizontal rectangles layered on top of each other.

Figure 4:
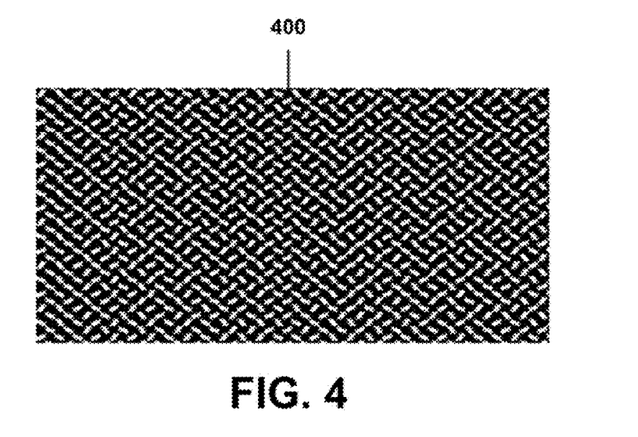

FIG. 4 is an illustration of a example of a second pattern in accordance with an embodiment of the invention. As will be discussed in greater detail, the second pattern 400 shown in FIG. 4 may decoded in three directions. Similar to the second pattern 18 (FIG. 1), the second pattern 400 may be stored in a computer memory, such as the computer device memory 16 (FIG. 1).

Figure 5:
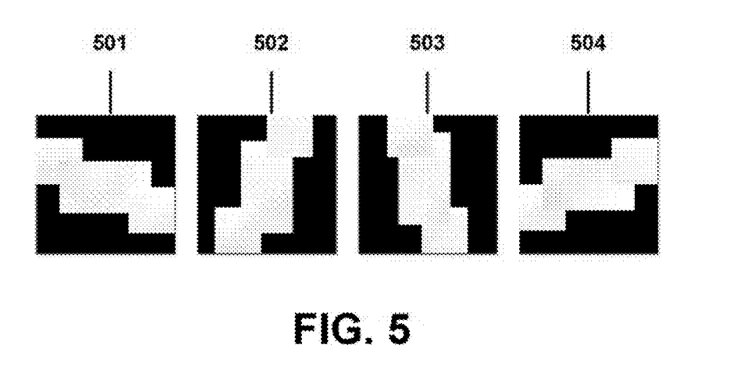

FIG. 5 is an illustration of an example of a pattern in accordance with an embodiment of the invention. More specifically, FIG. 5 illustrates four basic features 501, 502, 502, and 504 of the second pattern 400 (FIG. 4). The first basic feature 501 may be a stair-step shape that is first slanted at an angle of 22.5 degrees. The second basic feature 502 may be obtained by rotating the first basic feature 501 by 45 degrees. Similarly, the fourth basic feature 504 may be obtained by rotating the third basic feature 403 by 45 degrees. The features of the second pattern 400 (FIG. 4) may be invariant to rotation, and may provide additional resistance to blurring effects during decoding.

A pattern as described, for example, with respect to the first pattern 200 (FIG. 2), and the second pattern 400 (FIG. 4) may be designed according to an index. The index may be used to locate features on a target image.

Figure 6:
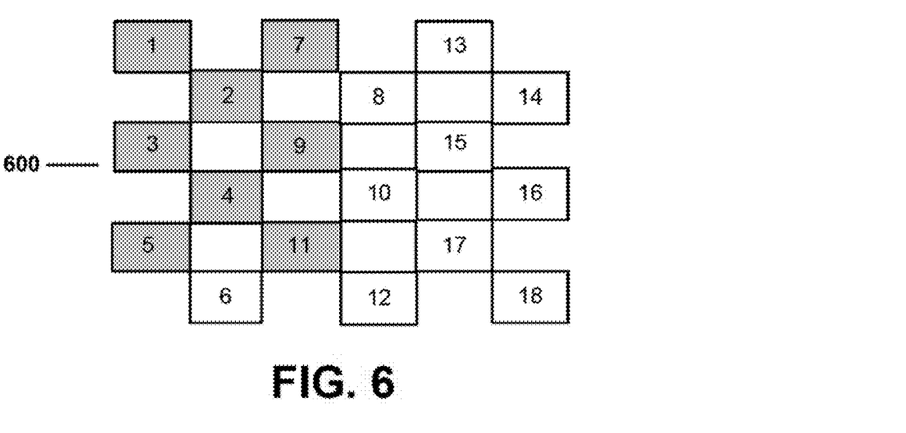
FIGS. 6-8 are illustrations of examples of indices in accordance with an embodiment of the invention.

FIG. 6 is an illustration of an example of an index in accordance with an embodiment of the invention. In this example, the index 600 includes eighteen squares (i.e., locations) arranged in six lines (or rows) of three. The index 600 may be populated with one or more letters, wherein each letter corresponds to a position in the index. A letter may be indicated by any symbol. In one example, a letter may indicated by language letter (e.g., a, b, c, . . . etc.). In the examples described below, a letter may be indicated by a number (e.g., 1, 2, 3, etc.).

So, in this example, the index 600 may be populated by letters 1, 2, 3, . . . 18, each of which correspond to a position in the index. The letter 1 may correspond to the upper left corner (i.e., line 1) of the index 600. On the other hand, letter 18 may correspond to the lower right corner (i.e., line 6) of the index 600. As will be discussed in greater detail, an index and its associated letters may be used to map features of captured from a target image.

In the exemplary embodiment illustrated in FIG. 6, the shaded portions of the index may represent features captured from a target image. Each of these features captured may be made to correspond to a letter. A letter may be associated with a feature according to any criteria (e.g., the shape of the feature).

Moreover, letters may be grouped together into a unique neighborhood of letters to form a feature word. So, in the exemplary embodiment illustrated in FIG. 6, the letters may be grouped together to describe a feature group of eight features that have a vertical characteristic, wherein the letters combine to form a unique, vertical feature word (i.e., 1, 7, 2, 3, 9, 4, 5, 11) made up of eight letters. As will be discussed in greater detail, the unique vertical feature word may then be analyzed (i.e., decoded) by a processing application (e.g., the processing application 20) to determine a horizontal position and a vertical position of each feature included in the unique vertical feature word, and further to calculate a depth of each feature included in the unique feature word. Moreover, a plurality of letters representing features may be analyzed together (e.g., in pairs) to determine a feature shape (i.e., horizontal, vertical, or diagonal).

Each feature word may include a reference point. For example, a feature word may be referenced by the feature found in the upper most left corner of the feature word. If this reference point is known, the location of all of the other features that make up the feature word may be known as well. So, in the example described in FIG. 5, if the feature word is referenced by the letter 1 (i.e., upper left most corner of the feature word), then the next letter, letter 2, may be just below and to the right of the letter 1.

Figure 7:
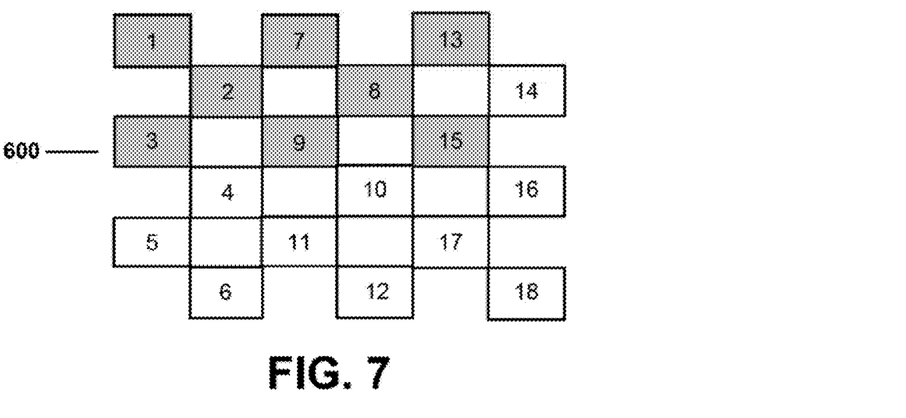

FIG. 7 is an illustration of an example of an index in accordance with an embodiment of the invention. FIG. 7 illustrates the same index 600 as that shown in FIG. 6, with the same letters describing the index. In this example, the letters (e.g., 1, 7, 11) may be grouped together to describe a feature group of eight features that have a horizontal characteristic, wherein the letters combine to form a unique, horizontal feature word (i.e., 1, 7, 13, 2, 8, 3, 9, 15) made up of eight letters. The unique horizontal feature word may then be analyzed by a processing application to determine a horizontal position and a vertical position of each feature included in the unique horizontal feature word, and calculate a depth of each feature included in the unique horizontal feature word.

Figure 8:
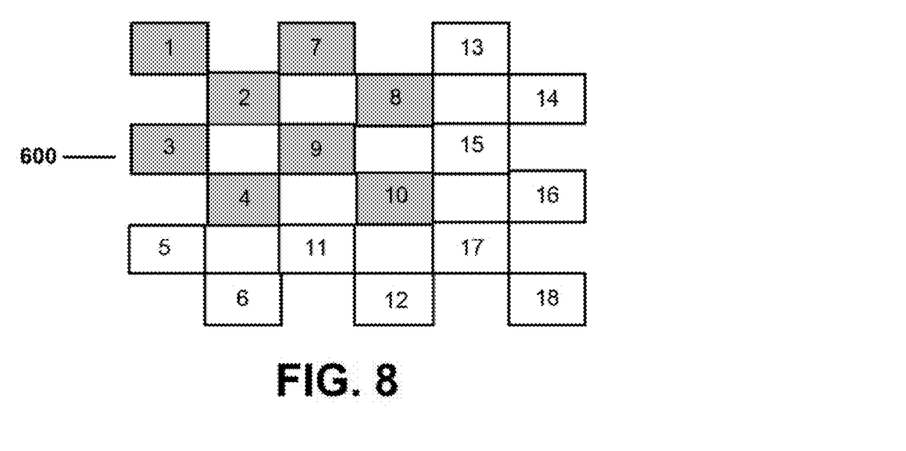

FIG. 8 is an illustration of an example of an index in accordance with an embodiment of the invention. FIG. 8 illustrates the same index 600 as that shown in FIGS. 5 and 6, with the same letters describing the index. In this example, the letters (e.g., 1, 7, 2) may be grouped together to describe a feature group of eight features that have a diagonal characteristic, wherein the letters combine to form a unique, diagonal feature word (i.e., 1, 7, 2, 8, 3, 9, 4, 10) made up of eight letters. The unique diagonal feature word may then be analyzed by a processing application to determine a horizontal position and a vertical position of each feature included in the unique diagonal feature word, and calculate a depth of each feature included in the unique diagonal feature word.

So, as shown, a feature (that may correspond to a particular letter) may be part of one or more feature words. For example, in the examples of FIGS. 5, 6, and 7, the letter 9 may be included in each of the vertical, horizontal, and diagonal feature word that is illustrated. In this manner, a feature that corresponds to a letter may be part of up to twenty four feature words (i.e., eight vertical feature words, eight horizontal feature words, and eight diagonal feature words).

In some cases, a processing application may generate an error in decoding the location information of a particular feature associated with a first (e.g., horizontal) feature word. However, as discussed above, each feature might participate in more than one feature word. Accordingly, in such the case of such an error, a processing application may decode a second (e.g., vertical) feature word that includes the particular feature to overcome the error with the second feature word. A processing application may also decode a third (e.g., diagonal) feature word that includes the particular feature, and compare the results to those of the first and second feature words. Indeed, as discussed above, this redundant processing may be used in up to twenty four feature words for each feature. As such, this may enable a higher degree of confidence with regard to the determining of a location of a particular feature.

Furthermore, a processing application may utilize the horizontal, vertical, and diagonal feature word-indexing described to improve detection of features (or objects) from a target image. This may be so because there may be a higher probability that one of the three types of feature words will better capture the shape of a feature (or object). For example, if an object is narrow and long, a vertical feature word describing the object may be decoded. On the other hand, if the object is narrow and short, a horizontal feature word may be used instead. As such, this may enable greater precision in decoding of features (or objects) retrieved from a target image, and may lead to more accurate depth calculations as well.

Although a feature word may be decoded to provide the horizontal position of a feature, a feature word may not necessarily be decoded to provide the vertical position. This may be so because, in some cases, a pattern displayed on a pattern slide (and corresponding to a particular index) may be repeated vertically to cover the entire area of a target image.

Figure 9:
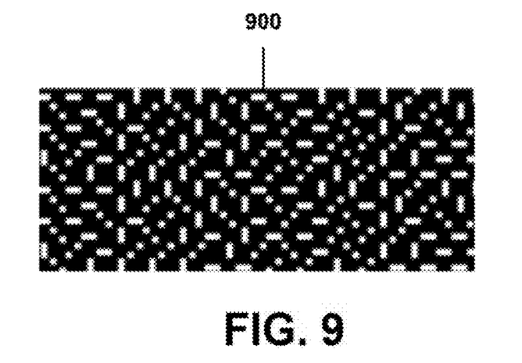
FIG. 9 is an illustration of an example of a pattern in accordance with an embodiment of the invention.

For example, a pattern 900 illustrated in FIG. 9 may be repeated every six lines. In such a case, if a feature is detected on the first of the six lines, the feature may actually be located on any one of the first, seventh, or thirteenth (and so on) line of the pattern slide.

Accordingly, a pattern according to embodiment of the present invention may also be designed to enable calculation of the vertical position using the principle of an epipolar constraint. The principle of the epipolar constraint is illustrated in FIG. 9. In this example, a point in a first image may generate a line in a second image upon which the point in the first image must lie.

Figure 10:
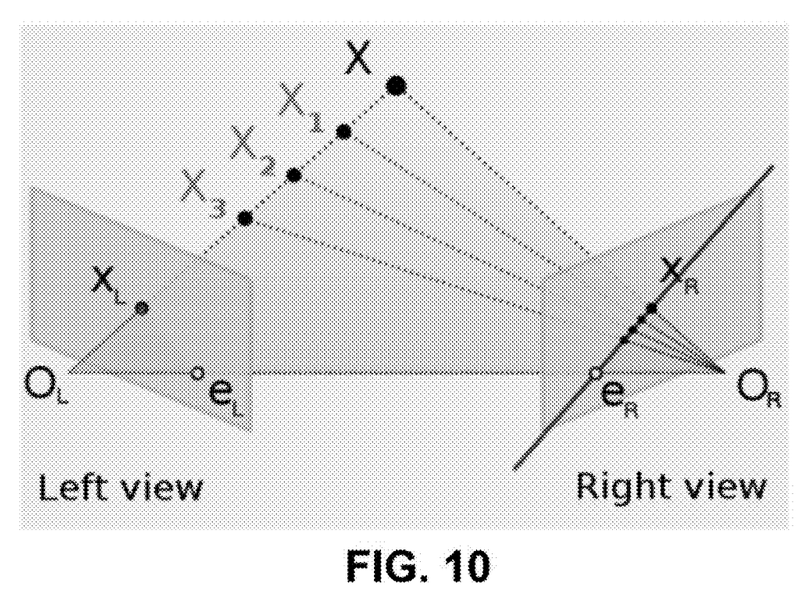
FIG. 10 is an illustration of an example of epipolar geometry with an embodiment of the invention.

So, in the example illustrated in FIG. 10 if the projection point $x_L$ is known, then the epipolar line $e_R$-$x_R$ may be known and the point X projects into the right image, on a point $x_R$ which must lie on this particular epipolar line. This may mean that for each point observed in one image the same point must be observed in the other image on a known epipolar line. This may provide an epipolar "constraint" that a processing application, such as the processing application 20 (FIG. 1), may utilize to determine if a point (or a feature) on a target image corresponds to a point (or feature) on a pattern slide. In other words, a processing application may utilize the epipolar constraint to determine a vertical position of a feature on a target image.

In addition, a processing application may also use principles of epipolar geometry to calculate a depth of a feature retrieved from a target image. So, in the example described in FIG. 10, if the points $x_L$ and $x_R$ are known, their projection lines are also known. If the two image points correspond to the same 3D point X, the projection lines must intersect precisely at X. This may mean that X can be calculated from the coordinates of the two image points, a process called triangulation. This process of triangulation may be used by a processing application, such as the processing application 20 (FIG. 1), to determine the depth of a feature on a target image.

Figure 11:
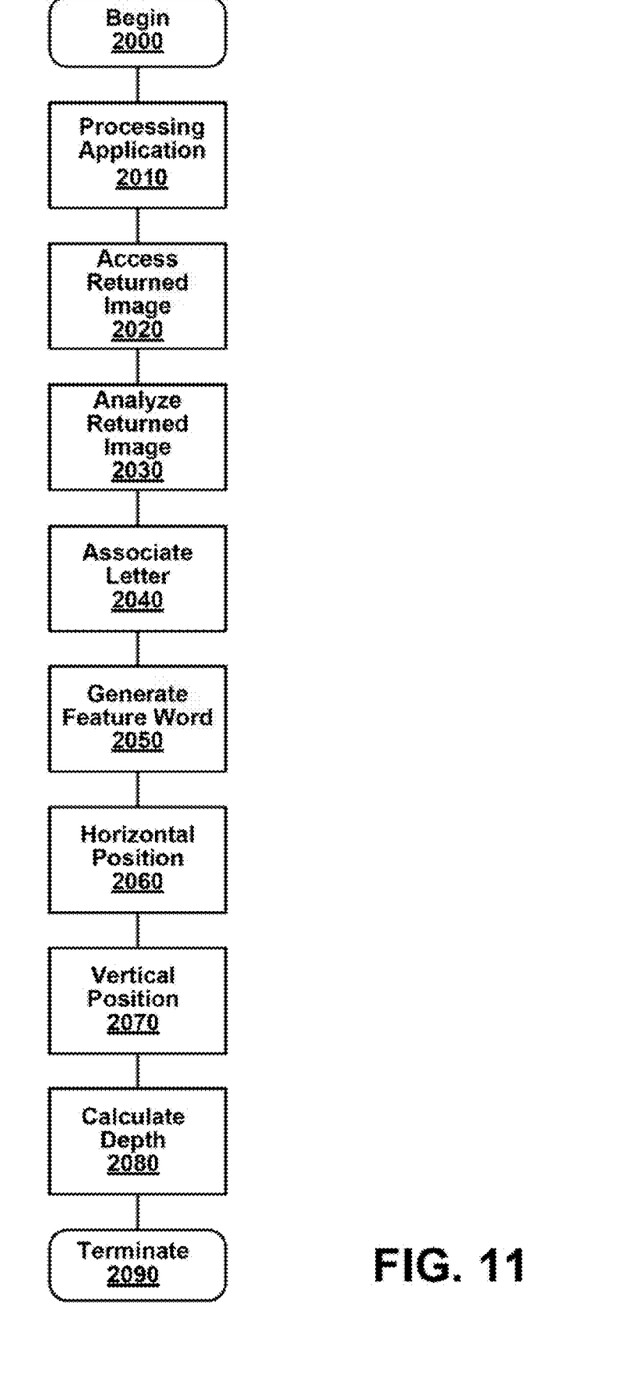
FIG. 11 is a flowchart of an example of a method of analysis of a structured light image in accordance with an embodiment of the invention.

Turning now to FIG. 11, a flowchart of an example of a method that may provide analyzing of a structured light pattern in accordance with an embodiment of the invention is shown. The method might be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

The process may begin at processing block 2000. At processing block 2010, a processing application, such as the processing application 20 (FIG. 1), stored on a computing device memory, such as the computing device memory 17 (FIG. 1), may be opened. At processing block 2020, the processing application may access a returned image, such as the returned image 21, to analyze the returned image to determine features on a target image. The returned image 21 may be stored in bitmap format.

At processing block 2030, the processing application may analyze the returned image to, recognize a first feature captured from the target image on to a pattern slide. At processing block 2040, the processing application may associate a letter with the first feature based the shape of the first feature.

At processing block 2050, the processing application may determine a unique neighborhood of features, thereby generating a "feature word" to describe the neighborhood of unique features. In this example, the feature word may be made up of eight letters.

At processing block 2060, the processing application may utilize an index associated with the pattern slide to determine a horizontal position of each feature in the feature word. More specifically, the pattern may be generated with a specific index that allows the locating the horizontal position within a particular line of the pattern slide.

At processing block 2070, the processing application may utilize an epipolar constraint to determine a vertical position of each feature in the feature word. At processing block 2080, the processing application may utilize triangulation to calculate a depth of each of the features in the feature word. At processing block 2090, the process may terminate.

The sequence and numbering of blocks depicted in FIG. 10 is not intended to imply an order of operations to the exclusion of other possibilities. Those of skill in the art will appreciate that the foregoing systems and methods are susceptible of various modifications, variations, and alterations.

For example, in the embodiment described above, the process may terminate after generating a second pattern image and a first pattern image. However, in other embodiments, an application, such as the processing application, may continue to process the second pattern image and the first pattern image to remove image noise.

Figure 12:
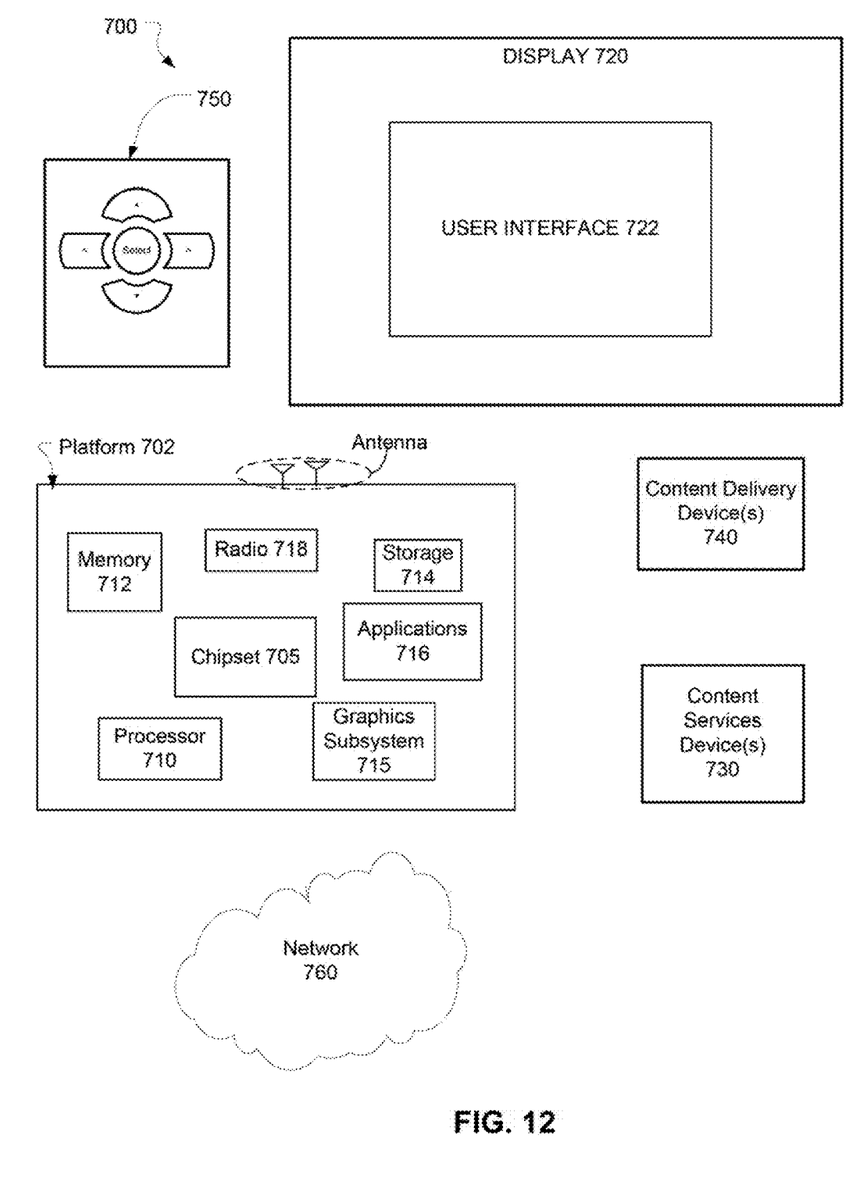
FIG. 12 is a block diagram of an example of a second system according to an embodiment.

FIG. 12 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an, internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent Service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications. 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
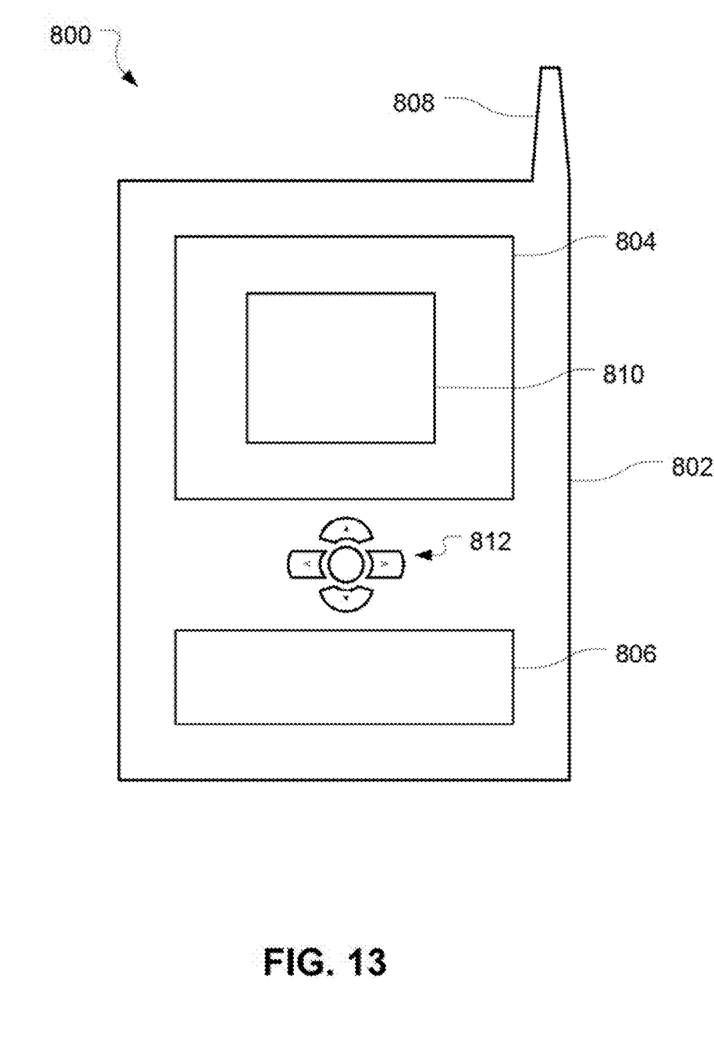
FIG. 13 is a block diagram of an example of a small form factor device according to an embodiment.

As described above, system 700 may be embodied in varying physical styles or form factors. FIG. 13 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Embodiments may therefore provide for a method of analyzing a structured light pattern including detecting a first feature of a target image in a return image, wherein the return image is captured using a pattern slide fabricated according to a pattern image, designating a feature type of the first feature, including assigning a first letter to the first feature, and associating an index with the first letter, wherein the index is associated with the pattern slide. A method may also provide for calculating a horizontal position in the pattern slide of the first feature, calculating a vertical position in the pattern slide of the first feature, and calculating a depth of the first feature.

In one example, the method may also provide for detecting a second feature of the target image, designating a feature type of the second feature, including assigning a second letter to the second feature, and associating the index with the second letter.

In one example, the method may provide for associating the first letter and the second letter to form a feature word.

In another example, calculating a horizontal position in the pattern slide of the first feature includes analyzing the feature word utilizing the index.

In another example, the feature word is one of a vertical feature word, a horizontal feature word, and a diagonal feature word.

In one example, calculating a horizontal position in the pattern slide of the first feature includes analyzing a plurality of a horizontal feature word, a vertical feature word, and a diagonal feature word utilizing the index.

In yet another example, calculating a vertical position in the pattern slide of the first feature includes analyzing a plurality of a horizontal feature word, a vertical feature word, and a diagonal feature word.

In another example, calculating a vertical position in the pattern slide of the first feature includes utilizing epipolar geometry.

In still another example, calculating a depth of the first feature includes utilizing triangulation.

In yet another example, the pattern slide is to be repeated periodically to cover the target image.

Embodiments may also include at least one machine readable medium comprising a plurality of instructions that in response to being executed on a computing device, cause the computing device to carry out any of the examples of the aforementioned method, an apparatus for analyzing a structured light pattern including an interface and logic configured to perform any of the examples of the aforementioned method and a system for analyzing a structured light pattern including an interface, a memory component, and logic configured to perform the method of any of the examples of the aforementioned method.

Another embodiment may provide for at least one computer readable storage medium comprising a set of instructions which, if executed by a processor, cause a computing device to detect a first feature of a target image in a return image, wherein the return image is to be captured using a pattern slide fabricated according to a pattern image, designate a feature type of the first feature, including assigning a first letter to the first feature, associate an index with the first letter, wherein the index is associated with the pattern slide. The set of instructions may also cause a computing device to calculate a horizontal position in the pattern slide of the first feature, calculate a vertical position in the pattern slide of the first feature, and calculate a depth of the first feature.

Yet another embodiment may provide an apparatus including a first detection module to detect a first feature of a target image in a return image, wherein the return image is to be captured using a pattern slide fabricated according to a pattern image, a first designation module to designate a feature type of the first feature, including assigning a first letter to the first feature, and a first association module to associate an index with the first letter, wherein the index is associated with the pattern slide. The apparatus may also include a horizontal position module to calculate a horizontal position in the pattern slide of the first feature, a vertical position module to calculate a vertical position in the pattern slide of the first feature, and a depth calculation module to calculate a depth of the first feature.

Still another embodiment may provide a system including a projector and a computing device. The computing device may include a first detection module to detect a first feature of a target image in a return image, wherein the return image is to be captured using a pattern slide fabricated according to a pattern image, a first designation module to designate a feature type of the first feature, including assigning a first letter to the first feature, and a first association module to associate an index with the first letter, wherein the index is associated with the pattern slide. The computing device may also include a horizontal position module to calculate a horizontal position in the pattern slide of the first feature, a vertical position module to calculate a vertical position in the pattern slide of the first feature, and a depth calculation module to calculate a depth of the first feature.

Another embodiment may provide for a method of analyzing a structured light pattern, comprising assigning a first letter to a first feature of a target image, assigning a second letter to a second feature of the target image, and associating an index with the first letter and the second letter. The method may also provide for associating the first letter and the second letter to form a feature word, calculating a horizontal position in the pattern slide of the first feature including analyzing the feature word utilizing the index, and calculating a depth of the first feature.

In one example, the feature word is one of a vertical feature word, a horizontal feature word, and a diagonal feature word.

In one example, calculating a horizontal position in the pattern slide of the first feature includes analyzing a plurality of a horizontal feature word, a vertical feature word, and a diagonal feature word utilizing the index.

In another example, the method may provide for calculating a vertical position in the pattern slide of the first feature.

In yet another example, calculating a vertical position in the pattern slide of the first feature includes analyzing a plurality of a horizontal feature word, a vertical feature word, and a diagonal feature word.

In still another example, calculating a depth of the first feature includes utilizing triangulation to calculate the depth of the first feature.

Embodiments may also include at least one machine readable medium comprising a plurality of instructions that in response to being executed on a computing device, cause the computing device to carry out any of the examples of the aforementioned method, an apparatus for analyzing a structured light pattern including an interface and logic configured to perform any of the examples of the aforementioned method and a system for analyzing a structured light pattern including an interface, a memory component, and logic configured to perform the method of any of the examples of the aforementioned method.

Yet another embodiment may provide for at least one computer readable storage medium comprising a set of instructions which, if executed by a processor, cause a computing device to assign a first letter to a first feature of a target image, assign a second letter to a second feature of the target image, and associate an index with the first letter and the second letter. The set of instructions may also cause a computing device to associate the first letter and the second letter to form a feature word, calculate a horizontal position in the pattern slide of the first feature including analyzing the feature word utilizing the index, and calculating a depth of the first feature.

Still another embodiment may provide an apparatus comprising a first assignment module to assign a first letter to a first feature of a target image, a second assignment module to assign a second letter to a second feature of the target image, and an index module to associate an index with the first letter and the second letter. The apparatus may also include a word module to associate the first letter and the second letter to form a feature word, a horizontal position module to calculate a horizontal position in the pattern slide of the first feature including analyzing the feature word utilizing the index, and a depth calculation module to calculate a depth of the first feature.

Another example may provide a system including a projector, a first assignment module to assign a first letter to a first feature of a target image, and a second assignment module to assign a second letter to a second feature of the target image. The system may also include an index module to associate an index with the first letter and the second letter, a word module to associate the first letter and the second letter to form a feature word, a horizontal position module to calculate a horizontal position in the pattern slide of the first feature including analyzing the feature word utilizing the index, and a depth calculation module to calculate a depth of the first feature.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections.

In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system, comprising:
   a projection device to emit light; and
   a computing device to analyze a return image of the emitted light including,
      a first detection module to detect a first feature of a target image in the return image, wherein the return image is to be captured onto a pattern slide fabricated according to a pattern image,
      a first designation module to designate a feature type of the first feature, including assigning a first letter to the first feature,
      a first association module to associate an index with the first letter, wherein the index is associated with the pattern slide,
      a horizontal position module to calculate a horizontal position in the pattern slide of the first feature,
      a vertical position module to calculate a vertical position in the pattern slide of the first feature, and
      a depth calculation module to calculate a depth of the first feature using structured light.

2. The system of claim 1, further including:
   a second detection module to detect a second feature of the target image;
   a second designation module to designate a feature type of the second feature, including assigning a second letter to the second feature; and
   a second association module to associate the index with the second letter.

3. The system of claim 2, further including a word module to associate the first letter and the second letter to form a feature word.

4. The system of claim 3, wherein the word module is to analyze the feature word utilizing the index to calculate a horizontal position in the pattern slide of the first feature.

5. The system of claim 3, wherein the feature word is one of a vertical feature word, a horizontal feature word, and a diagonal feature word.

6. The system of claim 1, wherein the horizontal position module is to analyze a plurality of a horizontal feature word, a vertical feature word, and a diagonal feature word utilizing the index to calculate a horizontal position in the pattern slide of the first feature.

7. The system of claim 1, wherein the vertical position module is to analyze a plurality of a horizontal feature word, a vertical feature word, and a diagonal feature word to determine a vertical position of the feature in a pattern slide.

8. A method of analyzing a structured light pattern, comprising:
   assigning a first letter to a first feature of a target image in a return image of a structured light pattern, wherein the return image is to be captured onto a pattern slide fabricated according to a pattern image;
   assigning a second letter to a second feature of the target image;
   associating an index with the first letter and the second letter;
   associating the first letter and the second letter to form a feature word;
   calculating a horizontal position in the pattern slide of the first feature including analyzing the feature word utilizing the index; and
   calculating a depth of the first feature.

9. The method of claim 8, wherein the feature word is one of a vertical feature word, a horizontal feature word, and a diagonal feature word.

10. The method of any of claims 9, wherein calculating a horizontal position in the pattern slide of the first feature includes analyzing a plurality of a horizontal feature word, a vertical feature word, and a diagonal feature word utilizing the index.

11. The method of claim 8, further including calculating a vertical position in the pattern slide of the first feature.

12. The method of claim 11, wherein calculating the vertical position in the pattern slide of the first feature includes analyzing a plurality of a horizontal feature word, a vertical feature word, and a diagonal feature word.

13. The method of claim 8, wherein calculating a depth of the first feature includes utilizing triangulation to calculate the depth of the first feature.

14. At least one non-transitory computer readable storage medium comprising a set of instructions which, if executed by a processor, cause a computing device to:
   assign a first letter to a first feature of a target image in a return image of a structured light pattern, wherein the return image is to be captured onto a pattern slide fabricated according to a pattern image;
   assign a second letter to a second feature of the target image;
   associate an index with the first letter and the second letter;
   associate the first letter and the second letter to form a feature word;
   calculate a horizontal position in the pattern slide of the first feature including analyzing the feature word utilizing the index; and
   calculate a depth of the first feature.

15. The at least one medium of claim 14, wherein the feature word is to be one of a vertical feature word, a horizontal feature word, and a diagonal feature word.

16. The at least one medium of claim 15, wherein calculating a horizontal position in the pattern slide of the first feature is to include analyzing a plurality of a horizontal feature word, a vertical feature word, and a diagonal feature word utilizing the index.

17. The at least one medium of claim 14, wherein, if executed, the instructions cause a computing device to calculate a vertical position in the pattern slide of the first feature.

18. The at least one medium of claim 17, wherein if executed, the instructions cause a computing device to analyze a plurality of a horizontal feature word, a vertical feature word, and a diagonal feature word to calculate the vertical position in the pattern slide of the first feature.

19. The at least one medium of claim 18, wherein calculating a depth of the first feature is to include utilizing triangulation to calculate the depth of the first feature.

20. An apparatus comprising:
   a first assignment module to assign a first letter to a first feature of a target image in a return image of a structured light pattern, wherein the return image is to be captured onto a pattern slide fabricated according to a pattern image;

a second assignment module to assign a second letter to a second feature of the target image;

an index module to associate an index with the first letter and the second letter;

a word module to associate the first letter and the second letter to form a feature word;

a horizontal position module to calculate a horizontal position in the pattern slide of the first feature including analyzing the feature word utilizing the index; and a depth calculation module to calculate a depth of the first feature.

21. The apparatus of claim 20, wherein the feature word is one of a vertical feature word, a horizontal feature word, and a diagonal feature word.

22. The apparatus of claim 21, wherein calculating a horizontal position in the pattern slide of the first feature is to include analyzing a plurality of a horizontal feature word, a vertical feature word, and a diagonal feature word utilizing the index.

23. The apparatus of claim 20, further including a vertical position module to calculate a vertical position in the pattern slide of the first feature.

24. The apparatus of claim 23, wherein the vertical position module is to analyze a plurality of a horizontal feature word, a vertical feature word, and a diagonal feature word to calculate the vertical position in the pattern slide of the first feature.

25. The apparatus of claim 20, wherein calculating a depth of the first feature is to include utilizing triangulation to calculate the depth of the first feature.

26. A system comprising:
a projector;
a first assignment module to assign a first letter to a first feature of a target image in a return image of a structured light pattern, wherein the return image is to be captured onto a pattern slide fabricated according to a pattern image;

a second assignment module to assign a second letter to a second feature of the target image;

an index module to associate an index with the first letter and the second letter;

a word module to associate the first letter and the second letter to form a feature word;

a horizontal position module to calculate a horizontal position in the pattern slide of the first feature including analyzing the feature word utilizing the index; and a depth calculation module to calculate a depth of the first feature.

27. The system of claim 26, wherein the feature word is one of a vertical feature word, a horizontal feature word, and a diagonal feature word.

28. The system of claim 27, wherein calculating a horizontal position in the pattern slide of the first feature is to include analyzing a plurality of a horizontal feature word, a vertical feature word, and a diagonal feature word utilizing the index.

29. The system of claim 26, further including a vertical position module to calculate a vertical position in the pattern slide of the first feature.

30. The system of claim 26, wherein the vertical position module is to analyze a plurality of a horizontal feature word, a vertical feature word, and a diagonal feature word to calculate the vertical position in the pattern slide of the first feature.

* * * * *